United States Patent
Noble

(10) Patent No.: US 7,958,403 B2
(45) Date of Patent: Jun. 7, 2011

(54) RECREATING ERRORS IN A NETWORK DEVICE

(75) Inventor: Gayle L. Noble, Boulder Creek, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 404 days.

(21) Appl. No.: 12/118,323

(22) Filed: May 9, 2008

(65) Prior Publication Data

US 2009/0282290 A1 Nov. 12, 2009

(51) Int. Cl.
*G06F 11/00* (2006.01)
(52) U.S. Cl. ............... 714/39; 714/41; 714/43
(58) Field of Classification Search ........... 714/41, 714/43, 39, 712
See application file for complete search history.

(56) References Cited

U.S. PATENT DOCUMENTS

| | | | | |
|---|---|---|---|---|
| 6,367,033 | B1 * | 4/2002 | Jibbe | 714/37 |
| 6,970,712 | B1 * | 11/2005 | Vo | 455/510 |
| 6,973,595 | B2 * | 12/2005 | Kaminsky et al. | 714/43 |
| 7,096,264 | B2 * | 8/2006 | Bonney et al. | 709/224 |
| 7,428,664 | B2 * | 9/2008 | Sirbu | 714/39 |
| 7,549,096 | B2 * | 6/2009 | McNamara | 714/712 |
| 2006/0107159 | A1 * | 5/2006 | Krasilinec et al. | 714/742 |
| 2009/0063968 | A1 * | 3/2009 | Wenig et al. | 715/704 |
| 2010/0162050 | A1 * | 6/2010 | Cathro | 714/44 |

* cited by examiner

*Primary Examiner* — Philip Guyton
(74) *Attorney, Agent, or Firm* — Matthew A. Pequignot; Pequignot + Myers LLC

(57) ABSTRACT

Recreating errors in a network device. In one embodiment, a method for recreating an error condition in a network device includes capturing a first set of commands sent to a network device; identifying an error condition in the network device, the error condition corresponding to the captured first set of commands; and sending a second set of commands to the network device in a second attempt to recreate the error condition. The second set of commands includes the first set of commands as well as additional commands that are configured to place the network device in substantially the same state as at the time that the first set of commands was sent to the network device.

15 Claims, 2 Drawing Sheets

Network 100

RECREATING ERRORS IN A NETWORK DEVICE

BACKGROUND

A protocol analyzer can be used to help engineers and designers solve challenges on serial and parallel buses in electronics and computing products. Protocol analyzers can be configured to analyze multiple network protocols. Protocol analyzers typically include features such as trace buffers and cross-sequence triggering.

Protocol analyzers can be configured to capture and analyze traffic from one or more buses. Corresponding debugging and analysis software can then be configured to analyze and display the traffic to a user. Network traffic containing error events is of particular interest. For example, a protocol analyzer may include very large trace buffers of 16, 64 or 256 million events. The protocol analyzer may then be in communication with a host computer, via a USB connection for example. The host computer can include corresponding debugging and analysis software that can be used to debug and analyze the network traffic stored in the trace buffers. The debugging and analysis software can sometimes use the network traffic stored in the trace buffers to recreate an error in a network device in an effort to determine the cause of the error.

It can sometimes be difficult to recreate an error in a network device using network traffic stored in the trace buffers. For example, transitory conditions in the network device during the original generation of the error may have been altered by the time that an attempt to recreate the error is performed. This alteration in these transitory conditions over time can make recreating the error difficult or impossible.

BRIEF SUMMARY

At least some embodiments described herein relate to recreating an error condition in a network device. In one embodiment, a method for recreating an error condition in a network device includes capturing a first set of commands sent to a network device; identifying an error condition in the network device, the error condition corresponding to the captured first set of commands; and sending a second set of commands to the network device in a second attempt to recreate the error condition. The second set of commands includes the first set of commands as well as additional commands that are configured to place the network device in substantially the same state as at the time that the first set of commands was sent to the network device.

This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered limiting of its scope, the embodiments will be described and explained with additional specificity and detail through the use of the accompanying drawings in which.

DETAILED DESCRIPTION

In accordance with embodiments described herein, errors are automatically recreated in a network device. In one embodiment, a method for recreating an error condition in a network device includes capturing a first set of commands sent to a network device; identifying an error condition in the network device, the error condition corresponding to the captured first set of commands; and sending a second set of commands to the network device in a second attempt to recreate the error condition. The second set of commands includes the first set of commands as well as additional commands that are configured to place the network device in substantially the same state as at the time that the first set of commands was sent to the network device.

First, some introductory discussion regarding an example network environment that may be used to employ embodiments described herein will be described with respect to FIG. 1. Then, various embodiments of the method for recreating an error condition in a network device will be described with respect to FIG. 2.

Computers are now increasingly taking a wide variety of forms. Computers may, for example, be handheld devices, appliances, laptop computers, desktop computers, mainframes, distributed computers, or even devices that have not been conventionally considered a computer. In this description and in the claims, the term "computer" is defined broadly as including any device or system (or combination thereof) that includes at least one processor, and a memory capable of having thereon computer-executable instructions that may be executed by the processor. The memory may take any form and may depend on the nature and form of the computer. A computer may be distributed over a network environment and may include multiple constituent computers.

Figure 1:
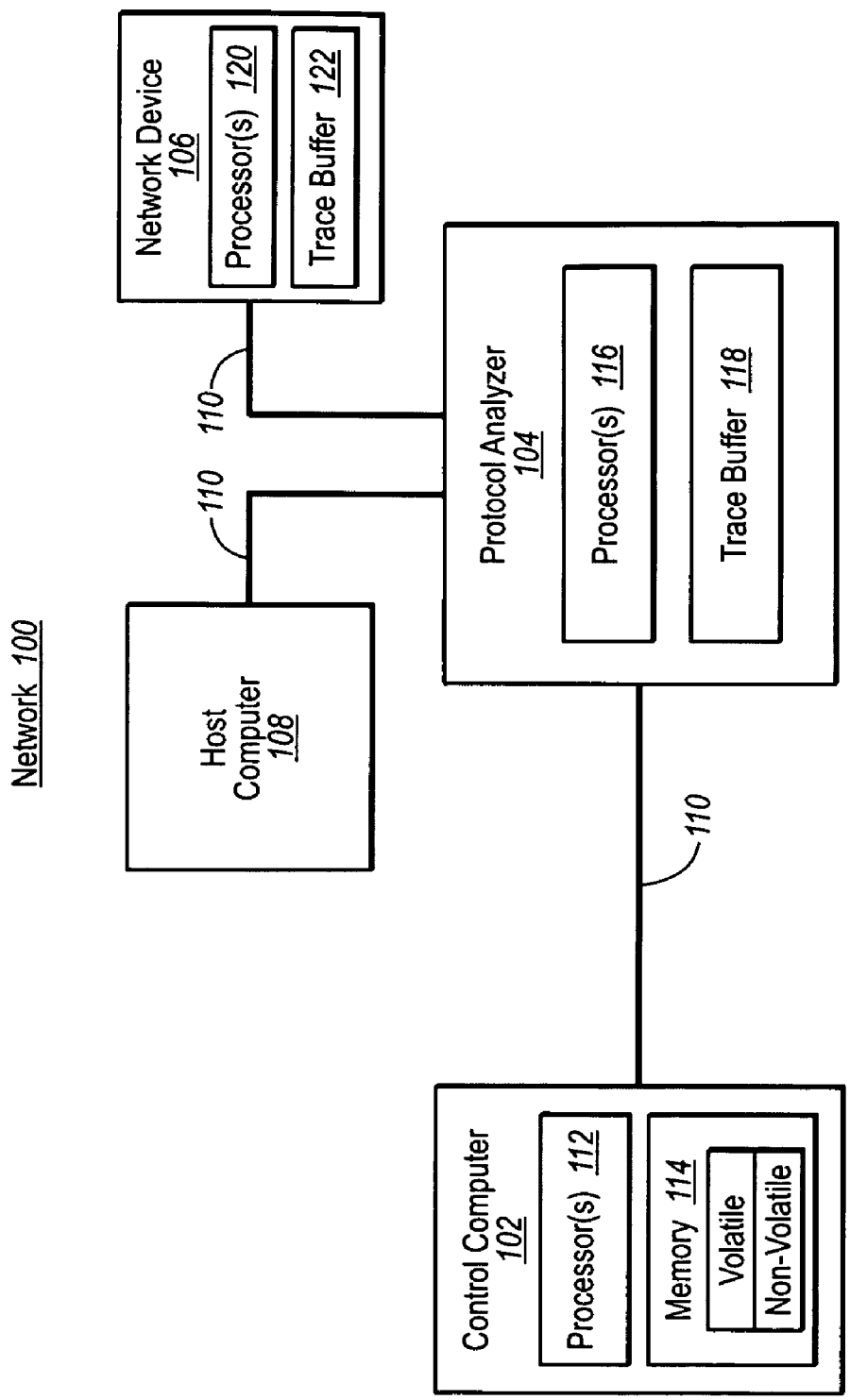
FIG. 1 illustrates an example network environment that may be used to employ embodiments described herein.

As illustrated in FIG. 1, an example network 100 includes a control computer 102, a protocol analyzer 104, a network device 106, and a host computer 108. The example network 100 also includes communication channels 110 that allow the control computer 102, the protocol analyzer 104, the network device 106, and the host computer 108 to communicate with each other. Communication channels 110 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

In its most basic configuration, the control computer 102 typically includes one or more processors 112 and memory 114. The memory 114 may be physical system memory, which may be volatile, non-volatile, or some combination of the two. The term "memory" may also be used herein to refer to non-volatile mass storage such as physical storage media. If the computer is distributed, the processing, memory and/or storage capability may be distributed as well. As used herein, the term "applications" can refer to software objects or routines that execute on the computer. The different applications described herein may be implemented as objects or processes that execute on the computer (e.g., as separate threads).

In its most basic configuration, the protocol analyzer 104 includes one or more processors 116 a trace 118. The protocol analyzer 104 is typically configured to monitor the communication channel 110 connecting the protocol analyzer 104 to the network device 106. In particular, the protocol analyzer 104 monitors the communication channel 110 for certain error conditions, including timeouts, missing events, and specific memory conditions. The error conditions that protocol analyzer 104 monitors for can be user-specified events, or system specified events that cause performance problems. For example, the protocol analyzer 104 can be configured to watch for a specific network traffic condition to occur, such as the presence of a certain frame type in the network traffic. When one of these error conditions is detected, a capture process is triggered and the protocol analyzer 104 captures data constituting the error condition from communications channel 110 and stores the data in a trace buffer 118. As used herein, the term "data constituting an event" refers to the data in which an event is identified, which can include data where expected information is missing or incomplete.

Trace buffer 118 therefore contains the data that was present on the communication channel 110 when an error condition was detected by the protocol analyzer 104. The implementation of trace buffer 118 can vary. In one embodiment, trace buffer 118 is a circular buffer that implements a first-in-first-out ("FIFO") scheme. A circular buffer can implement a first-in-first-out scheme by using an input pointer and an output pointer that are incremented each time a data element is processed, in a first-in/first-out manner. Upon reaching the end of a buffer, the pointers wrap around to the beginning of the buffer. In other words, trace buffer 118 is continuously collecting new data that overwrites some of the old data. In this way, some of the data that was present in trace buffer 118 prior to the error condition remains in trace buffer 118.

Serial data is received by protocol analyzer 104 by way of communication channel 110. Generally, the data stored in trace buffer 118 of protocol analyzer 104 can be (i) data received before the reception of the data constituting the error condition, (ii) the data constituting the error condition, (iii) the data received after the reception of the data constituting the error condition, or (iv) a combination of (i), (ii) and/or (iii). For example, a large portion of the data in trace buffer 118 can be data that was received after the reception of the data constituting the error condition. Likewise, a small portion of the data in trace buffer 118 can be data that was received before the reception of the data constituting the error condition.

After a trace of data is captured in trace buffer 118, the trace of data is ready for analysis by the control computer 102. Analysis of some or all of the data stored in trace buffer 118 by the control computer 102 enables a user to identify, by way of example, performance problems, system bus protocol problems, upper layer protocol problems, and logical and physical layer problems. In one implementation, all of the data in trace buffer 118 is analyzed by the control computer 102 before results of the analysis are presented on a user interface, such as user interface of the control computer 102 (not shown). In another implementation, only that portion of the data in trace buffer 118 which constitutes an identified event is analyzed by the control computer 102. Thus, a problem can potentially be solved without having to analyze all of the data in trace buffer 118. In other words, an analysis of only a portion of the data in trace buffer 118 may be sufficient.

In its most basic configuration, the network device 106 includes one or more processors 120 and a buffer 122. The network device 106 can be any network device capable of communication with the control computer 102, the protocol analyzer 104, the host computer 108, and other devices using one or more network protocols including, but not limited to, SSP, STP, SMP, SAS, SATA, or Fibre Channel, or some combination thereof For example, the network device 106 can be a hard disk drive.

In the description that follows, embodiments are described with reference to acts that are performed by one or more computers. If such acts are implemented in software, one or more processors of the associated computer that performs the act direct the operation of the computer in response to having executed computer-executable instructions. An example of such an operation involves the manipulation of data. The computer-executable instructions (and the manipulated data) may be stored in the memory 114 of the control computer 102.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
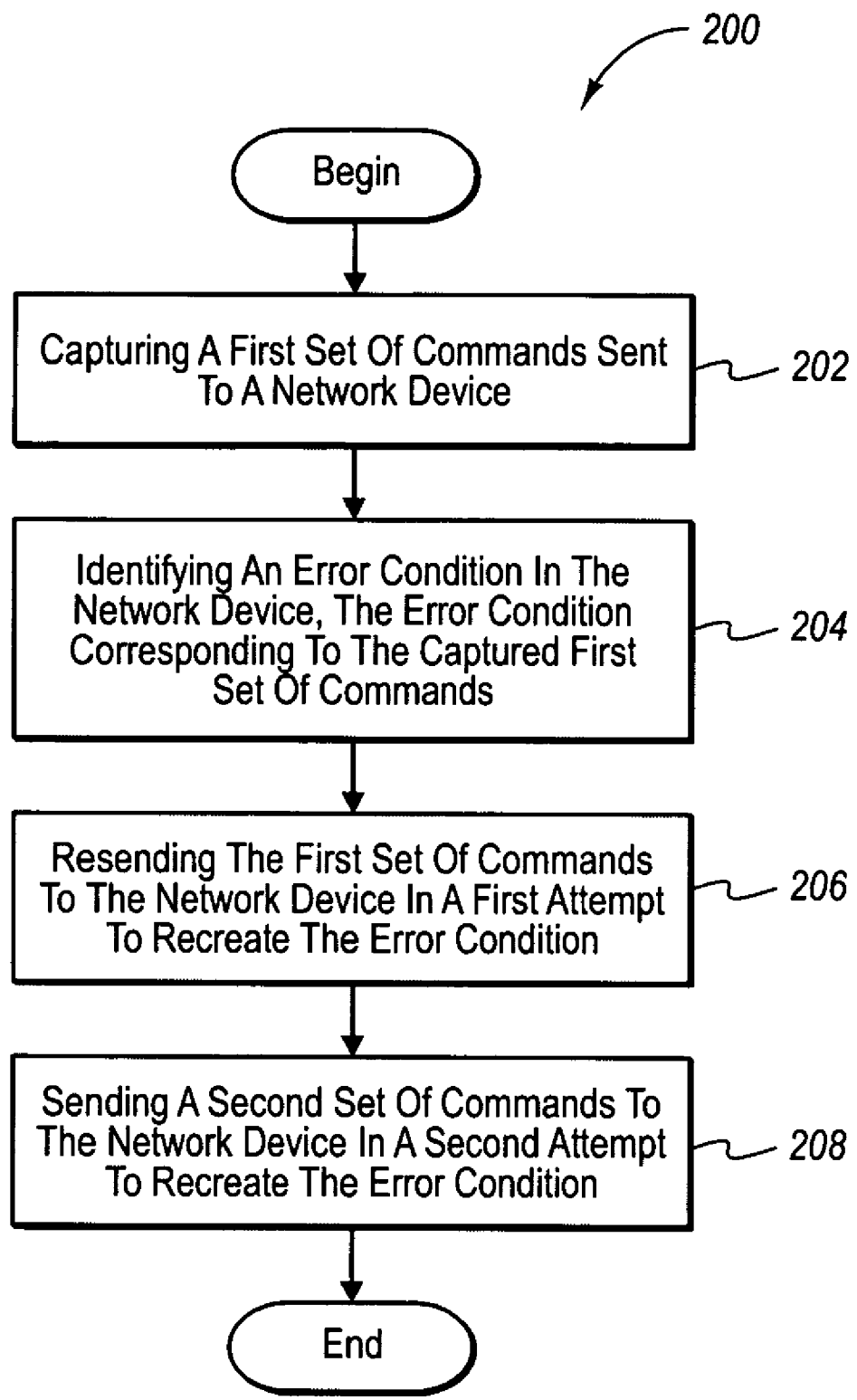
FIG. 2 illustrates a flowchart of a method for recreating an error condition in a network device.

FIG. 2 illustrates a flowchart of a method 200 for recreating an error condition in a network device. The method 200 may be implemented, for example, by the control computer 102 of FIG. 1. One or more applications running on the control computer 102 may have interest in recreating an error in the network device 106 in order to diagnose the cause of the error. The method 200 provides an automated way of recreating an error condition in the network device 106. The method 200 may be accomplished in response to computer-executable instructions being executed by the processor(s) 112 of the control computer 102. Those computer-executable instructions may be present on one or more computer-readable media of the type described herein.

The method 200 begins by capturing a first set of commands sent to a network device (act 202). For example, capturing a first set of commands sent to a network device may include employing the protocol analyzer 104 to capture a sequence of commands sent by the host computer 108 to the network device 106. The protocol analyzer 104 can capture in the trace buffer 118 a first set of commands sent to the network device 106 by the host computer 108. One or more applications running on the control computer 102 can then request the first set of commands from the trace buffer 118, or the protocol analyzer 104 can automatically forward the first set of commands from the trace buffer 118 to the one or more applications running on the control computer 102.

The method 200 then continues by identifying an error condition in the network device, the error condition corresponding to the captured first set of commands (act 204). For example, an error condition in the network device 106 can be identified by the one or more applications running on the control computer 102. For example, this error condition may be identified in response to the detection of an automatically generated error message of the network device 106.

The method 200 next continues by optionally resending the first set of commands to the network device in a first attempt to recreate the error condition (act 206). For example, one or more applications running on the control computer 102 can resend the first set of commands to the network device 106 in a first attempt to recreate the error condition. The one or more applications may employ a packet maker (not shown) to resend the first set of commands in packets to the network device 106 in a first attempt to recreate the error condition.

The method 200 then continues by sending a second set of commands to the network device in a second attempt to recreate the error condition (act 208). The second set of commands includes the first set of commands as well as additional commands that are configured to place the network device in substantially the same state as at the time that the first set of commands was sent to the network device. For example, one or more applications running on the control computer 102 can send a second set of commands to the network device 106 in a second attempt to recreate the error condition.

In some embodiments, the additional commands may be configured to place the buffer 122 of the network device 106 in substantially the same state as at the time the first set of commands was sent to the network device 106. For example, in some embodiments, the additional commands are configured to place the buffer 122 of the network device 106 in an overflow state. For example, the additional commands may include a stream of write commands of sufficient size to cause the buffer 122 of the network device 106 to overflow.

Also, in some embodiments, the additional commands may be configured to cause the first set commands to be executed by the network device 106 with the same or similar timing as when the error condition originally occurred. For example, the additional commands may include wait commands interleaved in the first set of commands. These wait commands can enable the timing of the execution of the first set of commands to occur with the same or similar timing as when the error condition originally occurred.

Further, in some embodiments, the additional commands are configured to place the network device 106 at substantially the same temperature as at the time the first set of commands was sent to the network device 106. In these embodiments, capturing a first set of commands sent to the network device 106 may further include recording the temperature of the network device 106 during the time that the first set of commands was sent to the network device 106. Recording the temperature of the network device 106 during the time that the first set of commands was sent to the network device 106 may include employing the protocol analyzer 104 to record the temperature of the network device 106 during the time that the first set of commands was sent to the network device 106.

Alternatively, one or more applications running on the control computer 102 or the protocol analyzer 104 can record the temperature of the network device 106. Applications such as Telnet could be initialized by the one or more applications to gather the temperature information. The temperature information may be gathered using interactive communications that are separate from the data gathering that is generally accomplished passively, usually by tapping one or more of the communication channels 110.

Accordingly, the example embodiments described herein permit errors to be automatically recreated in a network device. The example embodiments disclosed herein may be embodied in other specific forms. The described embodiments are to be considered in all respects only as illustrative and not restrictive. The scope of the invention is, therefore, indicated by the appended claims rather than by the foregoing description of example embodiments. All changes which come within the meaning and range of equivalency of the claims are to be embraced within their scope.

What is claimed is:

1. A method for recreating an error condition in a network device, the method comprising the following acts:
   capturing a first set of commands sent to a network device;
   identifying an error condition in the network device, the error condition corresponding to the captured first set of commands; and
   sending a second set of commands to the network device in an attempt to recreate the error condition,
   wherein the second set of commands includes the first set of commands as well as additional commands that are configured to place a buffer of the network device in substantially the same state as at the time the first set of commands was sent to the network device.

2. The method as recited in claim 1, wherein the additional commands are configured to place the buffer of the network device in an overflow state.

3. A method for recreating an error condition in a network device, the method comprising the following acts:
   capturing a first set of commands sent to a network device over a network;
   identifying an error condition in the network device, the error condition corresponding to the captured first set of commands;
   resending the first set of commands to the network device over the network in a first attempt to recreate the error condition; and
   sending a second set of commands to the network device over the network in a second attempt to recreate the error condition,
   wherein the second set of commands includes the first set of commands as well as additional commands that are configured to place a buffer of the network device in substantially the same state as at the time that the first set of commands was sent to the network device and that are further configured to place the network device at substantially the same temperature as at the time that the first set of commands was sent to the network device.

4. The method as recited in claim 3, wherein the act of capturing the first set of commands sent to the network device over the network comprises the act of recording the temperature of the network device at the time that the first set of commands was sent to the network device.

5. The method as recited in claim 4, wherein the act of recording the temperature of the network device at the time that the first set of commands was sent to the network device comprises the act of employing a protocol analyzer to record the temperature of the network device.

6. The method as recited in claim 3, wherein the act of capturing the first set of commands sent to the network device over the network comprises the act of employing a protocol analyzer to capture a sequence of commands forming the first set of commands.

7. The method as recited in claim 3, wherein the act of resending the first set of commands to the network device over the network in the first attempt to recreate the error condition comprises the act of employing a packet maker to resend the first set of commands.

8. The method as recited in claim 3, wherein the first set of commands sent to the network device are formatted in one of the following protocols: SSP, STP, SMP, SAS, SATA, or Fibre Channel.

9. A computer program product comprising one or more computer-readable media having thereon computer-executable instructions that, when executed by one or more processors of a computer, cause the computer to perform a method for recreating an error condition in a network device, the method comprising the following acts:
  capturing a first set of commands sent to the network device;
  identifying an error condition in the network device, the error condition corresponding to the captured first set of commands;
  resending the first set of commands to the network device in a first attempt to recreate the error condition; and
  sending a second set of commands to the network device in a second attempt to recreate the error condition,
  wherein the second set of commands includes the first set of commands as well as additional commands that are configured to place a buffer of the network device in substantially the same state as at the time that the first set of commands was sent to the network device.

10. The computer program product as recited in claim 9, wherein the act of capturing the first set of commands sent to the network device comprises the act of employing a protocol analyzer to capture a sequence of commands forming the first set of commands.

11. The computer program product as recited in claim 9, wherein the act of resending the first set of commands to the network device in the first attempt to recreate the error condition comprises the act of employing a packet maker to resend the first set of commands.

12. The computer program product as recited in claim 9, wherein the first set of commands sent to the network device are formatted in one of the following protocols: SSP, STP, SMP, SAS, SATA, or Fibre Channel.

13. The computer program product as recited in claim 9, wherein the additional commands are configured to place the buffer of the network device in an overflow state.

14. The computer program product as recited in claim 9, wherein the additional commands comprise wait commands interleaved in the first set of commands.

15. The computer program product as recited in claim 9, wherein the additional commands comprise a stream of write commands of sufficient size to cause the buffer of the network device to overflow.

* * * * *